(12) United States Patent
Kain

(10) Patent No.: US 12,523,312 B2
(45) Date of Patent: Jan. 13, 2026

(54) SELF-POWERED, MULTI-SENSING, AUTOMATIC SHUT-OFF VALVE

(71) Applicant: Aron Kain, Suffern, NY (US)

(72) Inventor: Aron Kain, Suffern, NY (US)

( * ) Notice: Subject to any disclaimer, the term of this patent is extended or adjusted under 35 U.S.C. 154(b) by 0 days.

(21) Appl. No.: 18/609,460

(22) Filed: Mar. 19, 2024

(65) Prior Publication Data
US 2024/0318737 A1 Sep. 26, 2024

Related U.S. Application Data

(60) Provisional application No. 63/472,303, filed on Jun. 11, 2023, provisional application No. 63/453,179, filed on Mar. 20, 2023.

(51) Int. Cl.
*F16K 17/36* (2006.01)
*F16K 31/02* (2006.01)
*F16K 37/00* (2006.01)

(52) U.S. Cl.
CPC .............. *F16K 17/36* (2013.01); *F16K 31/02* (2013.01); *F16K 37/005* (2013.01); *F16K 37/0091* (2013.01)

(58) Field of Classification Search
CPC ...... F16K 17/36; F16K 31/02; F16K 37/0091; F16K 37/005
USPC .......................................... 251/68; 137/487.5
See application file for complete search history.

(56) References Cited

U.S. PATENT DOCUMENTS

| | | | | |
|---|---|---|---|---|
| 4,841,287 A | * | 6/1989 | Flig | .......................... F16K 17/36 361/170 |
| 5,655,561 A | * | 8/1997 | Wendel | .................. G01F 23/243 137/59 |
| 7,296,485 B2 | | 11/2007 | Kain | |
| 7,360,413 B2 | | 4/2008 | Jeffries et al. | |
| 8,493,232 B2 | | 7/2013 | Cornwall et al. | |
| 9,057,453 B2 | | 6/2015 | Pitchford et al. | |
| 9,297,150 B2 | | 3/2016 | Klicpera | |
| 9,683,350 B1 | | 6/2017 | Mitzev et al. | |
| 10,672,252 B2 | | 6/2020 | Sale et al. | |

(Continued)

FOREIGN PATENT DOCUMENTS

| CA | 3108316 A1 | 1/2020 |
|---|---|---|
| CN | 218720627 U | 3/2023 |

(Continued)

OTHER PUBLICATIONS

International Search Report and Written Opinion mailed Jul. 1, 2024, from PCT/US2024/020538, 10 sheets.
(Continued)

*Primary Examiner* — Minh Q Le
(74) *Attorney, Agent, or Firm* — KATTEN MUCHIN ROSENMAN LLP

(57) ABSTRACT

The automatic shutoff valve (ASV) can extract ambient energy from the material that flows through it, so that the device is completely self-powered and does not require external connections to provide primary power for the operation of the device. The ASV can communicate with end users. The ASV can also incorporate multiple sensor disciplines to augment and enhance the ASV primary function of an automatic shutoff valve. Additionally, as the ASV has an internal command and control operational system using microcontroller technology.

21 Claims, 10 Drawing Sheets

(56) References Cited

U.S. PATENT DOCUMENTS

| | | | |
|---|---|---|---|
| 11,022,511 B2 | 6/2021 | Kain | |
| 11,549,837 B2 | 1/2023 | Klicpera | |
| 11,644,378 B2 | 5/2023 | Knauss et al. | |
| 11,709,108 B2 | 7/2023 | Enev et al. | |
| 2002/0170595 A1* | 11/2002 | Oliver | G05B 9/02 340/689 |
| 2008/0224877 A1* | 9/2008 | Young | G01F 1/38 340/606 |
| 2014/0034145 A1* | 2/2014 | Burt | F24D 19/0095 137/59 |
| 2014/0165719 A1 | 6/2014 | Williamson et al. | |
| 2016/0077530 A1* | 3/2016 | Moran | E03C 1/0408 700/282 |
| 2016/0356026 A1 | 12/2016 | Engler | |
| 2017/0075365 A1 | 3/2017 | Tarantino et al. | |
| 2018/0004233 A1* | 1/2018 | Lin | F16K 1/04 |
| 2018/0274212 A1* | 9/2018 | Kuchly | F16K 37/005 |
| 2021/0299496 A1 | 9/2021 | Boke et al. | |
| 2021/0332898 A1 | 10/2021 | Cellemme et al. | |
| 2022/0403951 A1 | 12/2022 | Greenboim | |
| 2023/0111808 A1 | 4/2023 | Dietzen et al. | |

FOREIGN PATENT DOCUMENTS

| | | | | |
|---|---|---|---|---|
| DE | 102016001939 A1 * | 8/2016 | | G01M 39/08 |
| DE | 102018118112 A1 | 1/2020 | | |
| EP | 1667370 B1 | 7/2014 | | |
| EP | 3348972 A1 | 7/2018 | | |
| WO | 2017137827 A1 | 8/2017 | | |
| WO | 2023122110 A1 | 6/2023 | | |

OTHER PUBLICATIONS

Written Opinion of the International Preliminary Examining Authority mailed Nov. 22, 2024, from International Patent Application No. PCT/US2024/020538, 6 sheets.

* cited by examiner

SELF-POWERED, MULTI-SENSING, AUTOMATIC SHUT-OFF VALVE

CROSS-REFERENCE TO RELATED APPLICATIONS

This application claims priority to U.S. Provisional Application Ser. No. 63/453,179, filed Mar. 20, 2023, and U.S. Provisional Application Ser. No. 63/472,303, filed Jun. 11, 2023, the entire contents of which are hereby incorporated by reference in their entirety.

FIELD OF INVENTION

The present invention relates to liquid/gas/solid shut off valves, and more particularly to automatic shutoff valves that sense a parameter or parameters, determine a constraint, and then actuate a shutoff mechanism to stop the flow of the material passing thru the valve. Even more particular, the present invention relates to self-powered devices that extract ambient energy from the flow of the material and use this energy to power the operation of the device.

BACKGROUND

Shutoff valves that are automatically actuated by some controlling parameter, constraint, or condition are well known to those skilled in the art. These shutoff valves are found in numerous applications across numerous industries wherever the need to control the flow of a material is required. However, these valves can be expensive, and, when electronically controlled and actuated, require electrical power to operate. In many industrial, commercial, or consumer applications this power is accessed thru external connections to the device that either primarily powers the device or is used to charge an internal battery contained within the device. Accessing this power can require running wires from the power source to the device. This can be expensive, logistically complex, time consuming, labor intensive or a combination of any of the above. Additionally, shutoff valves typically perform only one function—shutting off the flow. However, there are many other parameters that can be looked at within the device itself such as pressure, flowrates, volume of flow, temperature, chemical composition, etc. that can be incorporated into this single device, which at present are not done within industry.

SUMMARY

In accordance with the principles of the present invention, the preferred embodiment of the automatic shutoff valve produces a device that can extract ambient energy from the environment and/or the material that flows through it, so that the device is completely self-powered and does not require external connections to provide primary power for the operation of the device. The device, as taught herein, can communicate with end users, whether thru enterprise system software, cellphone applications, Bluetooth or any other wired, wireless, optical, or ultrasonic method. The device can also incorporate multiple sensor disciplines to augment and enhance the device's primary function of an automatic shutoff valve. Additionally, as the device has an internal command and control operational system using microcontroller technology, the device can be made smart to include, but not limited to, artificial intelligence/machine learning (AI/ML) for prognostication of condition-based maintenance of the device and the system to which it is monitoring, built-in diagnostics and device health monitoring, calibration coefficients, and many other capabilities as is well known to those skilled in the art. Finally, the components, processes and materials used to assemble and construct the device (machining, injection molding, stamping, etc.) are mature and commonly found (thermoplastics such as ABS, PEEK, acrylic, Polycarbonate, etc., brass, aluminum, steel, titanium) so that the device can be made for a fraction of the cost of existing shutoff valves. Furthermore, the device is of a small enough footprint that it can be used, in one particular application, to attach directly to individual appliances that use water, rather than to a system's main water supply, thereby allowing individual appliance control rather than needing to shut down the entire system consisting of many appliances, when a threshold flow condition exists. Additionally, because of the varied choice of materials to construct the device, and the simplicity of the design and functionality of purpose of the device, the device can be made very robust, accurate, and reliable so that its lifetime, without the need for repair or replacement, can extend to many years of service.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

Figure 1:
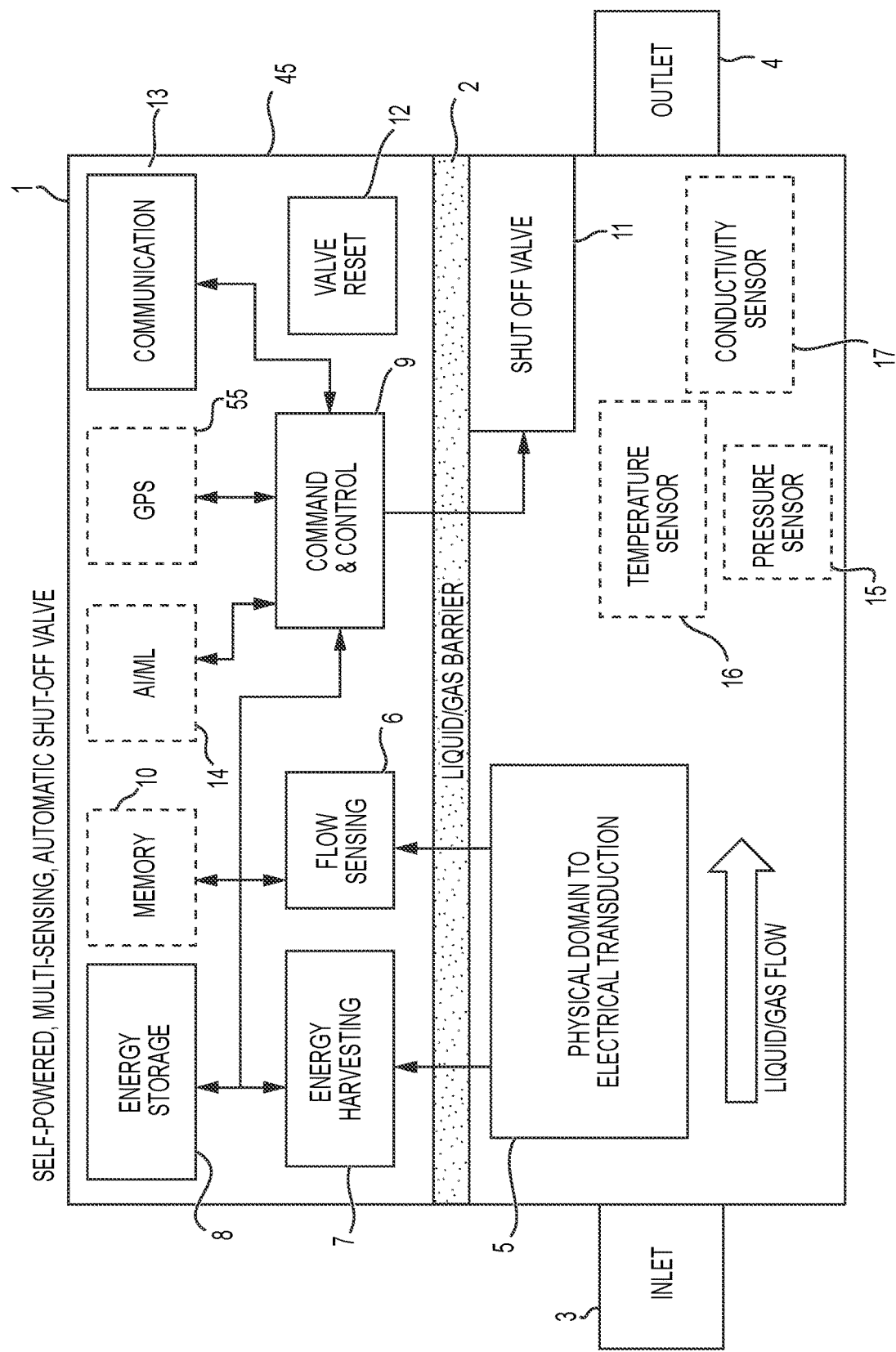
FIG. 1 is and overall block diagram of the invented Self-Powered, multi-sensing, Automatic Shut-off Valve (ASV) as taught herein.

The Self-Powered, multi-sensing, Automatic Shut-off Valve (ASV), 1, is comprised of a number of components. A block diagram of the ASV 1 is shown in FIG. 1. One key aspect of the invention as taught herein is that a barrier, 2, can be maintained between the material that's flowing (liquid, gas, solid, or combination thereof) and the sensing and operational electronics. This is important, particularly in the case of water flow, so that the electronics are maintained in a dry environment. Preferably, the sensing and operational electronics are all contained within a housing 45 to help maintain them in an isolated and dry environment. Preferably, the housing allows the passing of electric fields, magnetic fields, or RF signals through the material of the housing 45. An inlet, 3, and outlet, 4, is provided in the ASV 1 in order to allow the material to flow through the device. A physical domain to electrical element, 5, is provided to use the flowing material to convert the mechanical motion, whether vibrational or non-vibrational, or thermal gradient of the material to an electrical signal that can be used for flow measurement as well as provide energy to operate the ASV 1 in a self-powered manner. It is to be understood that physical domain parameters external to the flow of material, such as, but not limited to, light, sound, wind, and vibration can also be used to harvest energy to self-power the ASV 1. For example, energy harvesting from light can be obtained by mounting a solar cell on the outside of the housing 45 and wiring the output of the photovoltaic cell into the ASV 1. Alternatively, a rotating fan that captures the wind and causes a rotor to rotate within a stator based on the strength of the wind pushing the fan blades, can also be used to capture ambient energy. The output of the stator/rotor generator is then fed into the ASV 1 via a wired connection to the ASV's 1 energy harvester circuit.

This transduction element, 5, can perform this transduction no matter the orientation of the element to the flow of material. As such, the motion of the element can be rotational, linear, periodic, oscillatory, or any motion that one skilled in the art of motional apparatuses can appreciate. In the case of mechanical to electrical transduction, once the motional flow has been converted to and electrical signal, both the signal and the energy contained in the signal can be used. If, for example, the signal that is produced is periodic in nature (sinusoid, pulse train, etc.) both the amplitude and/or the periodicity can be used to measure the flow of the material in the flow sensor, 6. If, for example, the motional transducer is rotational in operation, meaning the transducer's mechanical components rotate within the material flow, anyone skilled in the art will appreciate that the flow sensor, 6, can measure the variation in the amplitude of the signal and/or the variation in the frequency of the signal to indicate the flow rate of the material, i.e. the faster the flow the faster the mechanical component rotates generating a higher amplitude signal and/or a higher frequency signal, and this variable signal will now be an indication of the flow rate. If the volume of the chamber in which the flow is occurring is known, then the mass flow of the material can also be determined.

Alternatively, a component of the transduction element, 5, might only generate a step function signal, as it may only move from one location to another based on the flow, so that the flow sensor will simply be a GO/NOGO sensor indicating that flow is occurring. Furthermore, if the linear motion provides a transduced signal that is a continuum signal based on the location of the transduction element along a known motional path, such as found in an LVDT, this too can be used by the flow sensor to determine flow rate. Anyone skilled in the art will appreciate the many means of determining flow rate based on how the transduction of flow to electrical signal can occur.

It is important to note that the invention, as taught herein, focuses on the ability to capture and use ambient energy from sources internal, external, or combination thereof, to the device, rather than focusing on a particular source of this energy as prior art has done, as will be seen in this disclosure. The energy from the transduction element, 5 can also be used to provide power to operate the ASV 1 itself. This is accomplished in the energy harvesting component, 7, of the ASV 1. The energy, in the form of voltage and/or current of the signal can be used to recharge an energy storage device, 8, such as a rechargeable battery or supercapacitor. The command and control module, 9, typically a microcontroller (MCU) available from numerous manufacturers, orchestrates, controls, operates and allows functionality to occur throughout the components of the ASV 1. For example, the MCU, 9, regulates when the flow sensor, 6, takes a measurement, accesses the memory, 10, to store the data, turns off the energy harvester, 7, when the energy storage component, 8, is full, and signals the shut off valve, 11, when to turn off the flow of the material based on, for example, when the desired threshold level of the flow exceeds a certain limit. Anyone skilled in the electronics art will appreciate the MCU's 9 ability to control and provide functionality to the operation of the ASV 1.

Once the shutoff valve 11 of the ASV 1 is activated (i.e., the current condition of the flow is changed from ON to OFF or OFF to ON based on desired functionality) a valve reset, 12, capability is provided to allow the ASV 1 to return to its initial operational configuration. This reset capability can be either an electronic or mechanical reset of the ASV 1.

The invention as taught herein can operate completely autonomously, as the ASV 1 forms a complete closed loop feedback network between sensing flow, shutting off flow, and resetting flow based on the programming of the MCU 9. The ASV 1 can be used as a "set it and forget it" device without the need for a user to intervene in the operation or to send external commands to the device to actuate the valve mechanism.

However, the ASV 1 also has communication capability as well. The communications component, 13, can take many forms, as anyone skilled in the art will appreciate. The communications can be wireless or wired and may be, but not limited to, optical, RF, acoustic, microwave, millimeter wave, ethernet, RS-232 and other communications protocols and technologies. In the case of wireless communications, a mesh network capability is built directly into the communications component, 13, thru the command and control exerted by the MCU, 9. This allows each ASV 1 to communicate with other ASV's 1 in the network as well as directly communicate with gateway nodes such as modems, cellphones, and personal digital assistants. This invention, as taught herein, eliminates the need for the overall system of ASV's 1 to require external RF repeaters to communicate, thereby reducing a significant expense of having additional hardware/software required to operate the system. The system is self-organizing, self-healing, and provides store and forward capability in each ASV 1 so that transporting the data from an individual ASV 1 to a gateway location might occur thru multiple ASV's 1 acting as mesh nodes or access points, or directly to a gateway device, depending on which RF path is most advantageous. It is understood by those skilled in the art that a mesh network might take many kinds of forms such as, but not limited to, star, tree, daisy-chain, and ring topologies to accomplish the task of porting the information from a particular ASV 1 to the gateway and ultimate user interface.

Furthermore, the ASV, 1, has much more capability. Not only can it have, but not limited to, self-diagnostic testing, built in calibration, health monitoring, alarm warning, and request for maintenance capability, as understood by those skilled in the art, but it can also include on-board decision making capability, but not limited to, Artificial Intelligence/Machine learning (AI/ML), 14, fuzzy logic, neural networks, and state machine implementation such as found in FPGA's, to enhance its functionality. For example, but not limited to, it can store multiple measurements over time in its memory, 10, and use these measurements to analyze usage trends, degradation in performance, prognostication as to potential upcoming faults in the system for which it is monitoring and controlling the material flow, etc. Because the ASV, 1, has memory, 10, an MCU, 9, and the ability to incorporate decision making capability such as AI/ML models and programming, 14, the ASV 1 is not simply a shutoff valve but a powerful diagnostic and prognostic device that can help efficiency, cost, time, and effort for those that use the ASV 1 in their systems and operations, as anyone skilled in the art of sensor device usage will appreciate. Having on-board memory 10, measurement capability, and an MCU 9 to command, control and communicate, allows the ASV 1 to be completely autonomous to decide when the shut-off valve 11 needs to be activated, and when to be reset, without the need for some remote database to analyze sensor data and then communicate to the ASV 1 to activate the valve as is found in prior art. This uniquely allows the ASV 1 to be stand alone in that it does not need an entire infrastructure of external resources such as power, user interface, other ASV's 1, repeaters, end user software, etc. to function properly. It can be used individually as a "set it forget it" device, or it can be used in conjunction with other independent autonomous ASV's 1 to form a powerful ecosystem.

Additionally, because of the modular nature of the invention as taught herein, additional sensing capability can be added as per needs of application. Sensitive leak detection can be accomplished by adding a pressure sensor, 15, to the ASV 1 in addition to the base flow sensor, 6, either as a stand-alone integrated pressure sensor circuit, or built into the barrier, 2, as taught in Kain U.S. Pat. No. 11,022,511B2, incorporated by reference in its entirety herein, and/or by adding a temperature sensor, 16, in order to perform flow compensation measurements allowing for changes in viscosity due to temperature can be made, and material characterization can be made by adding a conductivity sensor, 17, either as a stand-alone integrated circuit, or built into the barrier, 2, as taught in Kain U.S. Pat. No. 11,022,511B2. Furthermore, since the invention as taught herein contemplates multiple ASV's 1 connected in an ecosystem of devices that can be distributed over a spatially separate domain, such as the entire united states, sensing the individual ASV's 1 actual location, such as by, but not limited to, GPS 55, is quite beneficial.

This combination of AI/ML, 14, command and control, 9, memory, 10, and multiple sensing capability, 6, 15, 16, 17 makes the ASV 1 a powerful diagnostic and predictive device. For example, measuring over time the same flow rate, but increased pressure, and an increase in material conductivity such as found in water, can very well indicate scale build up in the pipes indicating a need for preventive maintenance.

It will be appreciated by those skilled in the art that other types of sensors can be added to the device to enhance functionality in an easily accessible manner such as taught in Kain WO 2023/1222110 A1. For example, the invention as taught herein, can contemplate, but not be limited to, adding a flame/smoke detector to the device when the ASV 1 is incorporated into a sprinkler system, so that upon detection of a fire, the ASV 1 activates and allows fire extinguishing material to flow through the sprinkler system.

Figure 2:
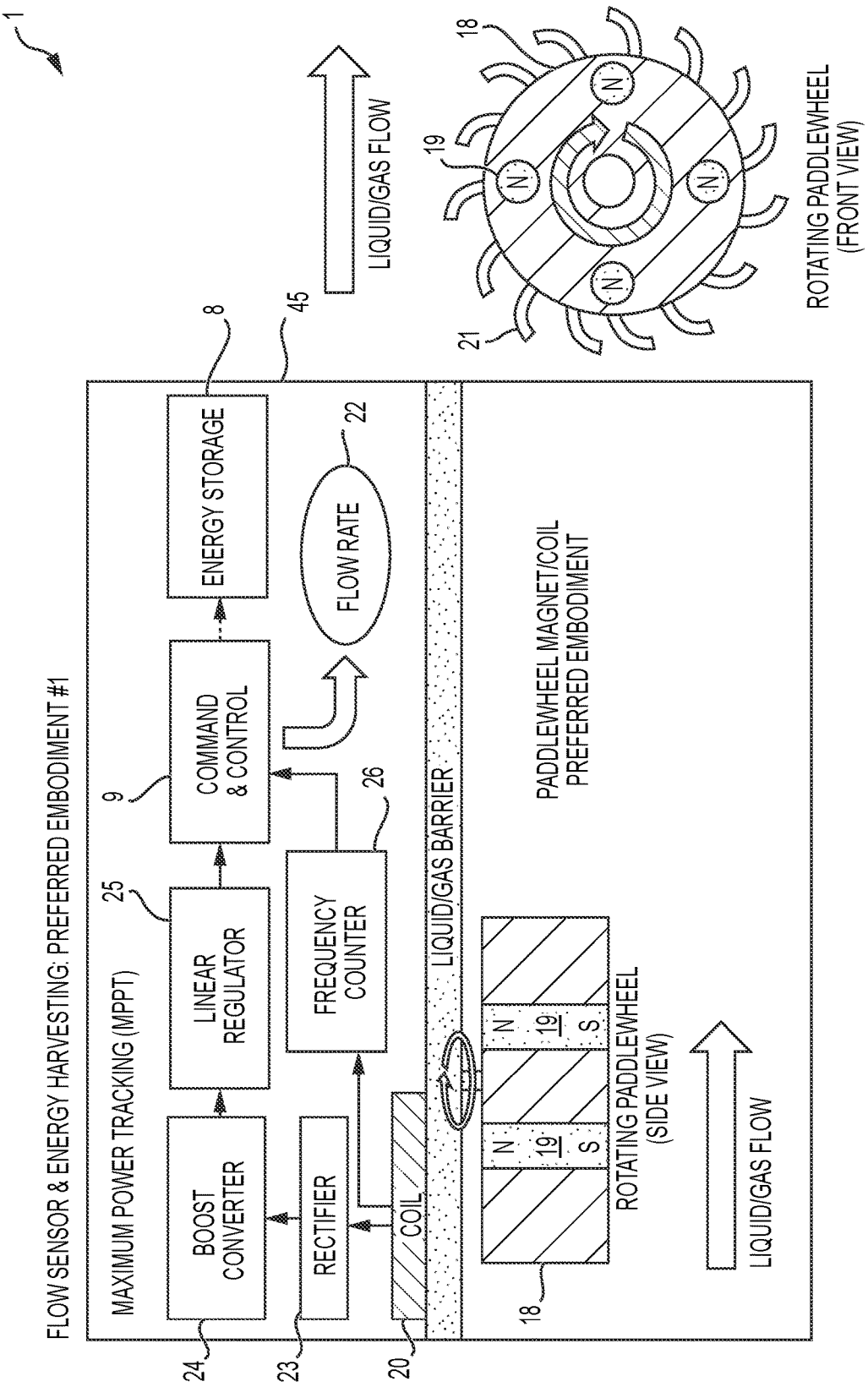
FIG. 2 is a block diagram of a preferred embodiment of the invention as taught herein.

The physical domain transduction element, 5, can take many forms. One of the preferred embodiments is shown in FIG. 2. A simple paddlewheel, 18, embedded with any number of magnets, 19, coupled with a planar inductive coil, 20, can be used for this purpose. As the vanes, 21, of the paddlewheel, 18, are pushed by the flow of the material, the paddlewheel, 18, rotates around a center. Orienting the paddlewheel, 18, in close proximity to the pickup planar inductive coil, 20, allows the invention as taught herein, to take advantage of Faraday's law of induction. Since the magnetic field of the magnets, 19, extends into the environment outside of the magnet, 19, itself, by positioning the coil, 20, so that as the paddlewheel, 18 rotates within the material, the magnet 19, rotates past the proximity coil, 20. The magnet, 19, will induce a current flow and voltage amplitude within the coil based on Faraday's law of induction. Since the magnetic field of the magnet, 19, can penetrate most materials, a material to electronics barrier, 2, can be used to isolate the electronics which can be made into a single, integrated printed circuit board (PCB), for example, to provide a modular design, as the electronics are on a single, drop in board, and not have the flowing material contaminate the PCB. As the magnet, 19, passes the coil, 20, a typically sinusoidal voltage signal is generated with the amplitude determined by how close the coil, 20, is to the magnet, 19, the strength of the magnet, 19, number of turns in the coil, 20, diameter of the coil, 20, and other design factors well known to those skilled in the art. The frequency of the sinusoidal voltage generated is proportional to how fast the magnet, 19, passes the face of the coil, 20, which is in turn, proportional to how fast the material is flowing causing the paddlewheel, 18, to turn. The frequency counter 26 measures the frequency and reports the result to the MCU, 9, so that the flow rate, 22, can be determined.

At the same time, the same sinusoidal voltage signal can be fed into a rectifier, 23, such that the sinusoidal voltage is converted into a DC voltage. This DC voltage can be fed into a boost converter with or without maximum power point tracking (MPPT), 24, to raise the voltage to the desired level, or can be fed directly into the regulator, 25, provided the induced voltage in the coil is sufficient, after rectification, to charge the energy storage, 8, directly. The MCU, 9, can then control the charging cycle of the energy storage device, 8, using standard battery charging/monitoring electronics as is well known in the arts.

As such, the electrical signal generated by the paddlewheel, 18, as part of the mechanical to electrical transduction element, 5, can be used both as a flow sensor as well as an energy harvesting signal for the ASV's, 1, self-powered operation.

Figure 3A:
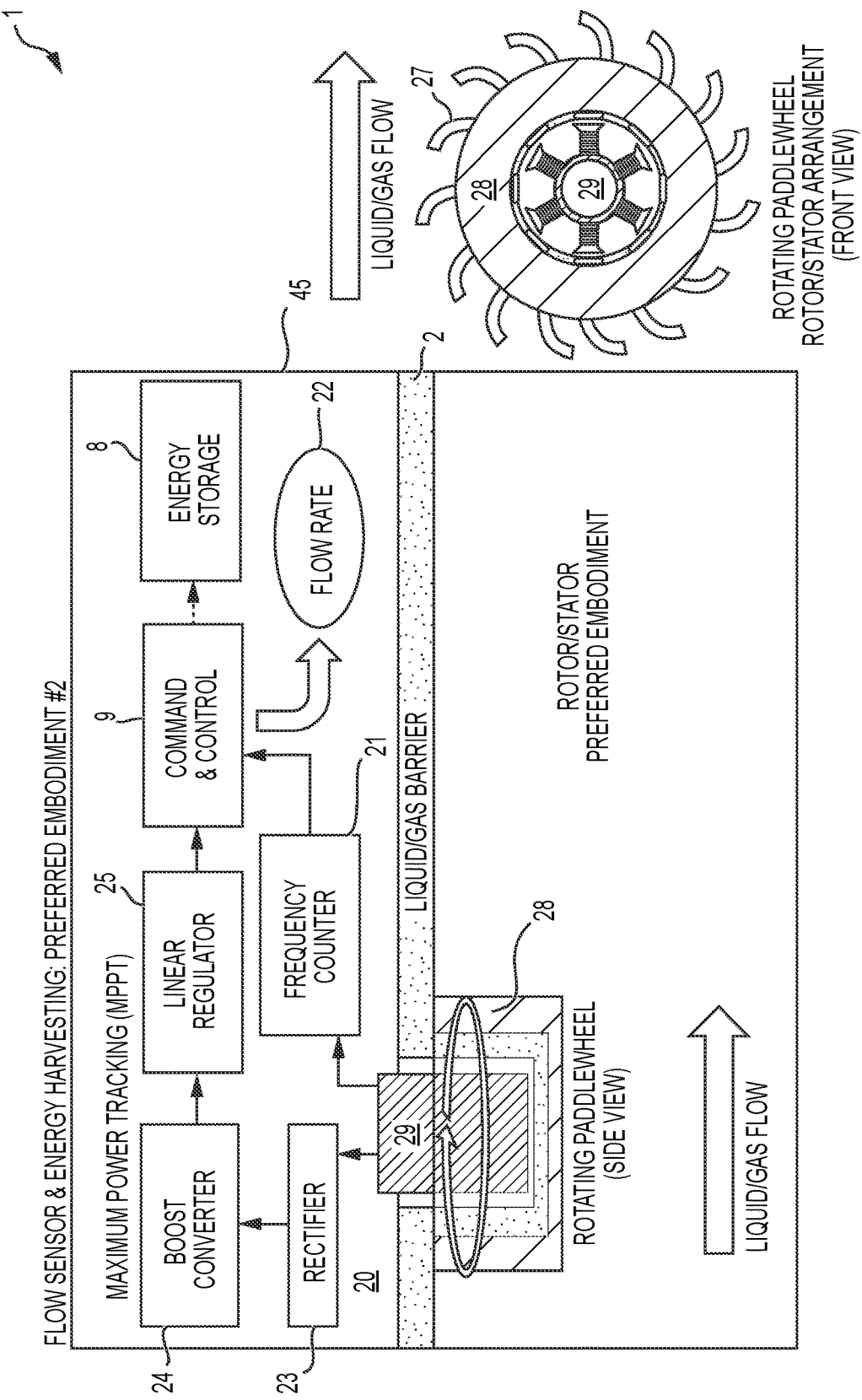
FIG. 3A is a block diagram of another preferred embodiment of the invention as taught herein.

Another preferred embodiment of the mechanical to electrical transduction element, 5, is shown in FIG. 3A. In this embodiment the paddlewheel/coil arrangement is replaced by the rotor/stator, 27, arrangement. This well known configuration forms the basis of many motor and electrical generator devices well known to those skilled in the art. Again, because the generation of an electrical signal relies on Faraday's law of induction, the rotational motion of the rotor, 28, which is a magnet housed in a paddlewheel arrangement with vanes, 21, induces a voltage/current in the stator, 29, which consists of a magnetic core and coiled wire. Furthermore, the rotor can be spatially separated from the stator so that the rotor resides in the flowing material compartment and the stator resides in the electronics compartment, maintaining the desired barrier, 2. The electronics portion of the ASV 1 remains the same as in FIG. 2 for this preferred embodiment of FIG. 3A.

Figure 3B:
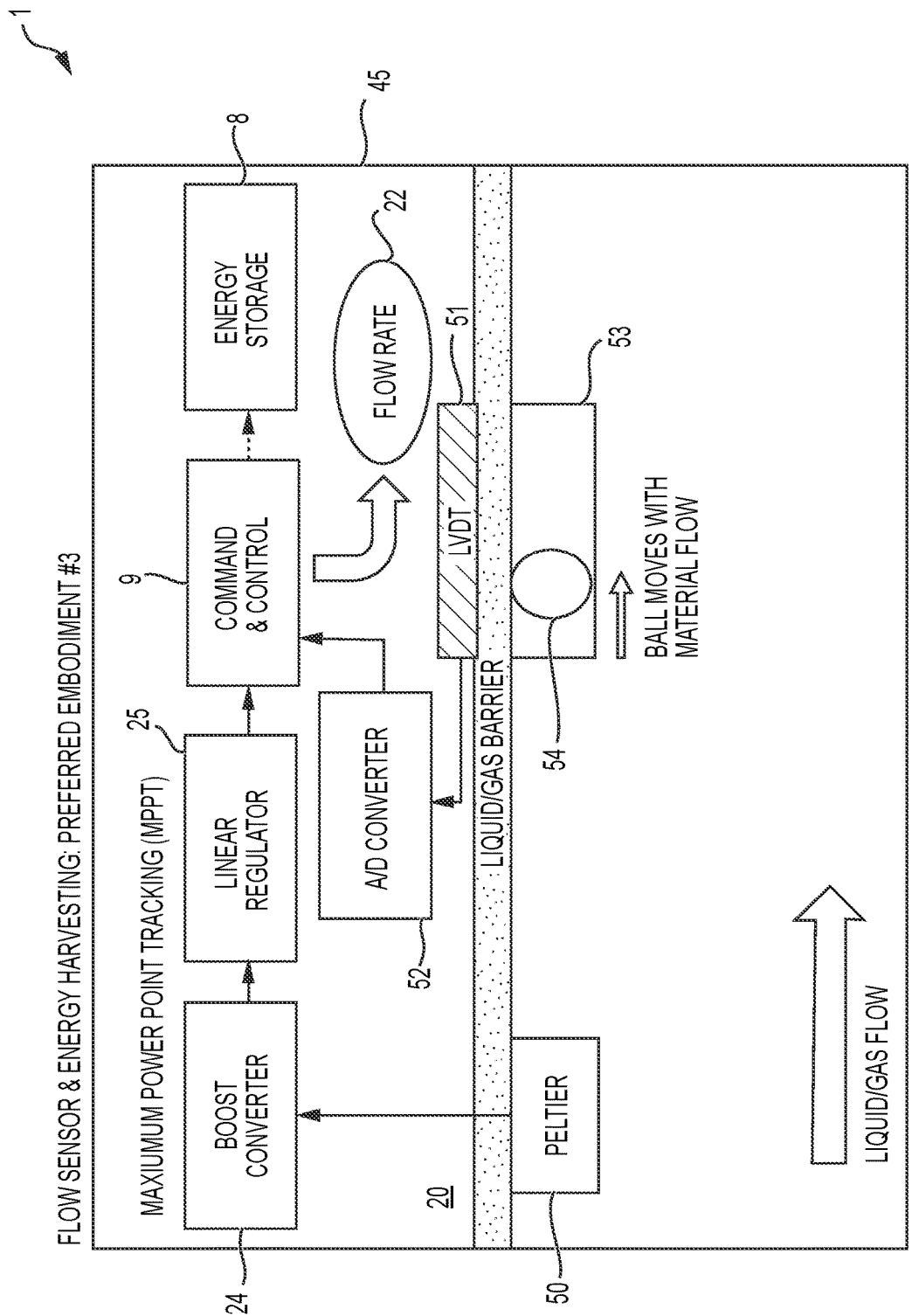
FIG. 3B is a block diagram of another preferred embodiment of the invention as taught herein.

The previous 2 embodiments relied on rotating components that can wear over time. Sometimes it's advantageous to have the ASV 1 configured where there is a minimum of moving parts. We can achieve this capability by using thermal transduction as shown in FIG. 3b. A Peltier element, 50 is inserted into the material flow region. The Peltier element generates electricity proportional to the temperature gradient across itself. For example, if cold water is flowing in the ASV 1 and the ASV electronics are at room temperature the temperature gradient will produce electricity. This is an example of an energy harvester that has no moving parts. By employing an linear variable differential transformer (LVDT), 51, in conjunction with a moving ball arrangement in the material flow, such as ball, 54, moving along tube, 53, and the orientation of the ASV 1 is vertical so that gravity tends to pull the ball to the left while the flowing material tend to push the ball to the right, the LVDT 51 can sense where the ball is in the tube, and hence the flow rate of the material. The LVDT's output is then sent to an A/D converter, 52, and subsequently to the MCU, 9 for flow rate data processing.

Figure 3C:
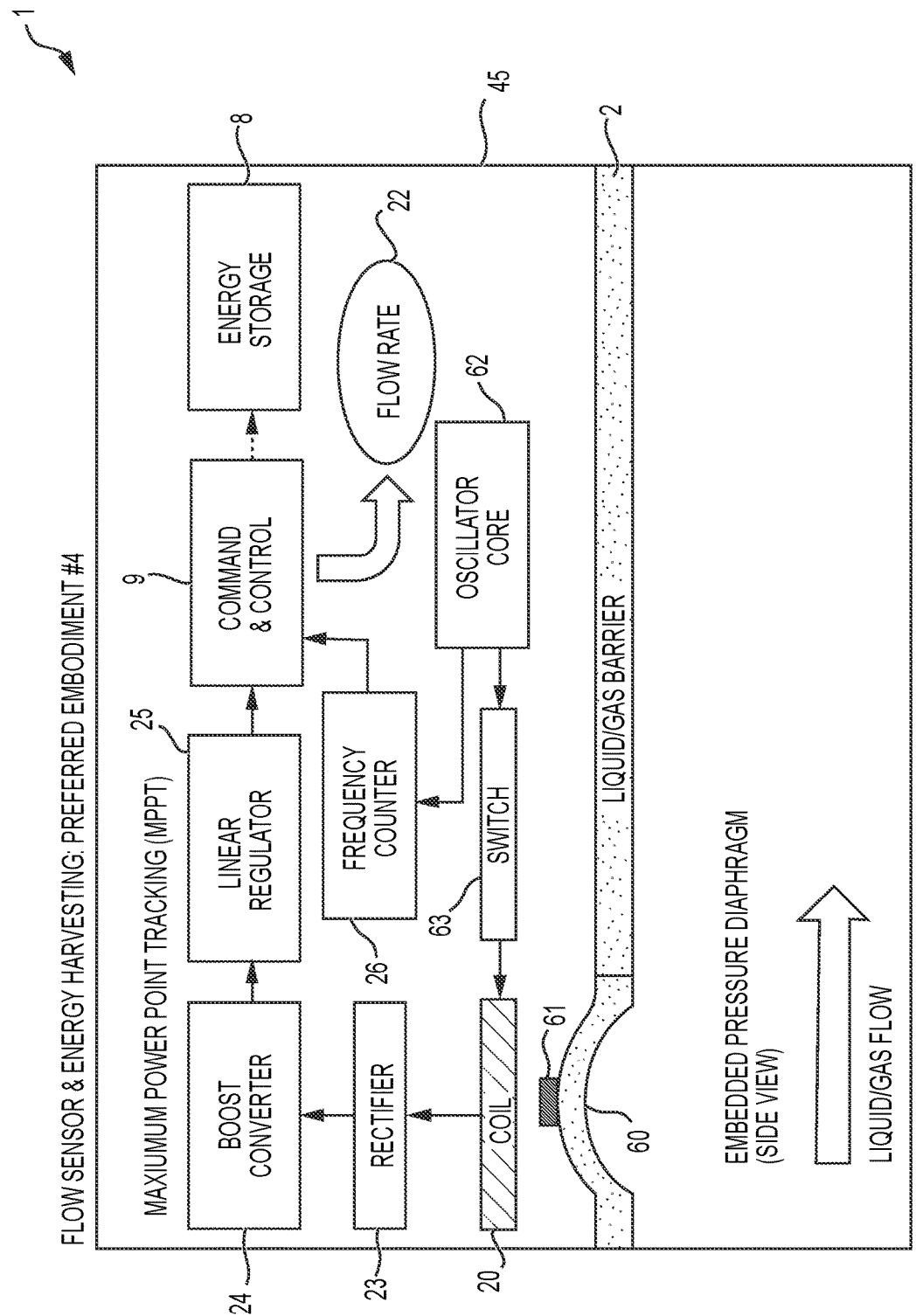
FIG. 3C is a block diagram of another preferred embodiment of the invention as taught herein.

Another minimally moving part preferred embodiment is shown in FIG. 3c. In this embodiment a pressure diaphragm, 60, is embedded within the barrier 2, as taught, for example, in Kain U.S. Pat. Nos. 11,022,511B2 and 7,296,485, incorporated by reference in their entirety. By adding a magnet, 61, onto the deflecting diaphragm we achieve energy harvesting, flow rate, and pressure sensing all in one topology. For example, as water flows thru the ASV 1, as described above, the diaphragm will vibrate causing the magnet, 61, to move up and down as the diaphragm flexes due to the flowing water. As has been taught herein using Faraday's law of induction a voltage will be developed in coil 20 that is proportional to the magnet 61 motion. As taught herein, this voltage signal can be used for energy harvesting. Furthermore, the mere fact that there is a motional induced voltage generated in the coil 20, indicates that water is flowing, and so by measuring the time duration of the voltage signal in the MCU, 9, the flow rate can be established. Once the water has stopped flowing, a static pressure is developed in the ASV 1 and so the diaphragm 60 deflects to a static position based on the diaphragm design and the static pressure. If we now connect coil 20, to an oscillator core, 62, such as, but not limited to, and LC oscillator, where the connection is activated by a switch, 63, controlled by MCU 9, this diaphragm deflection is sensed by coil 20 as a change in inductance of the coil and hence a change in the frequency of the oscillator core, 62, which in turn is sensed by frequency counter 26, so that the static deflection is proportional to the static pressure in the ASV 1, we now have a single physical element, the embedded diaphragm 60 and magnet 61, that provides energy harvesting, flow rate, and pressure using a minimally moving part structure.

Whereas other automatic shutoff valves, such as made by Moen, Kohler, and Delta, require external power, cost in the hundreds of dollars, require professional installation, and primarily are attached to a water main, the invention as taught herein is small in size, costs in the tens of dollars, does not require professional installation, does not require any external power hookup or source, and can be installed directly at the appliance needed to be monitored and acted upon. This provides significant advantages for system wide monitoring, analysis of functionality and efficiency, and allows prognostication as to system and appliance maintenance and life cycle management. This can be seen through the illustration of FIGS. 4 and 5.

Figure 4:
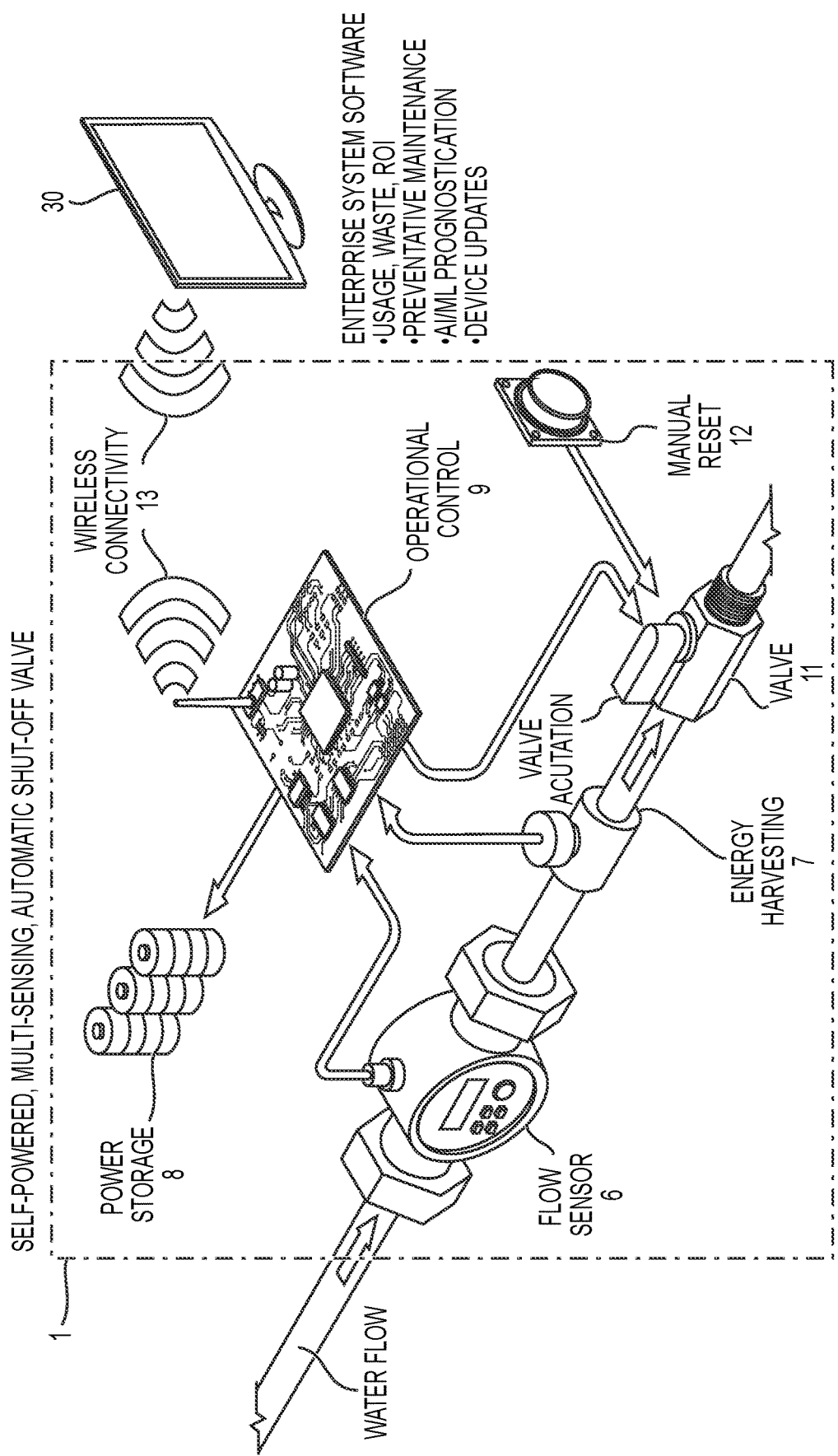
FIG. 4 is an illustration of the ASV communicating with the enterprise system software.
Figure 5:
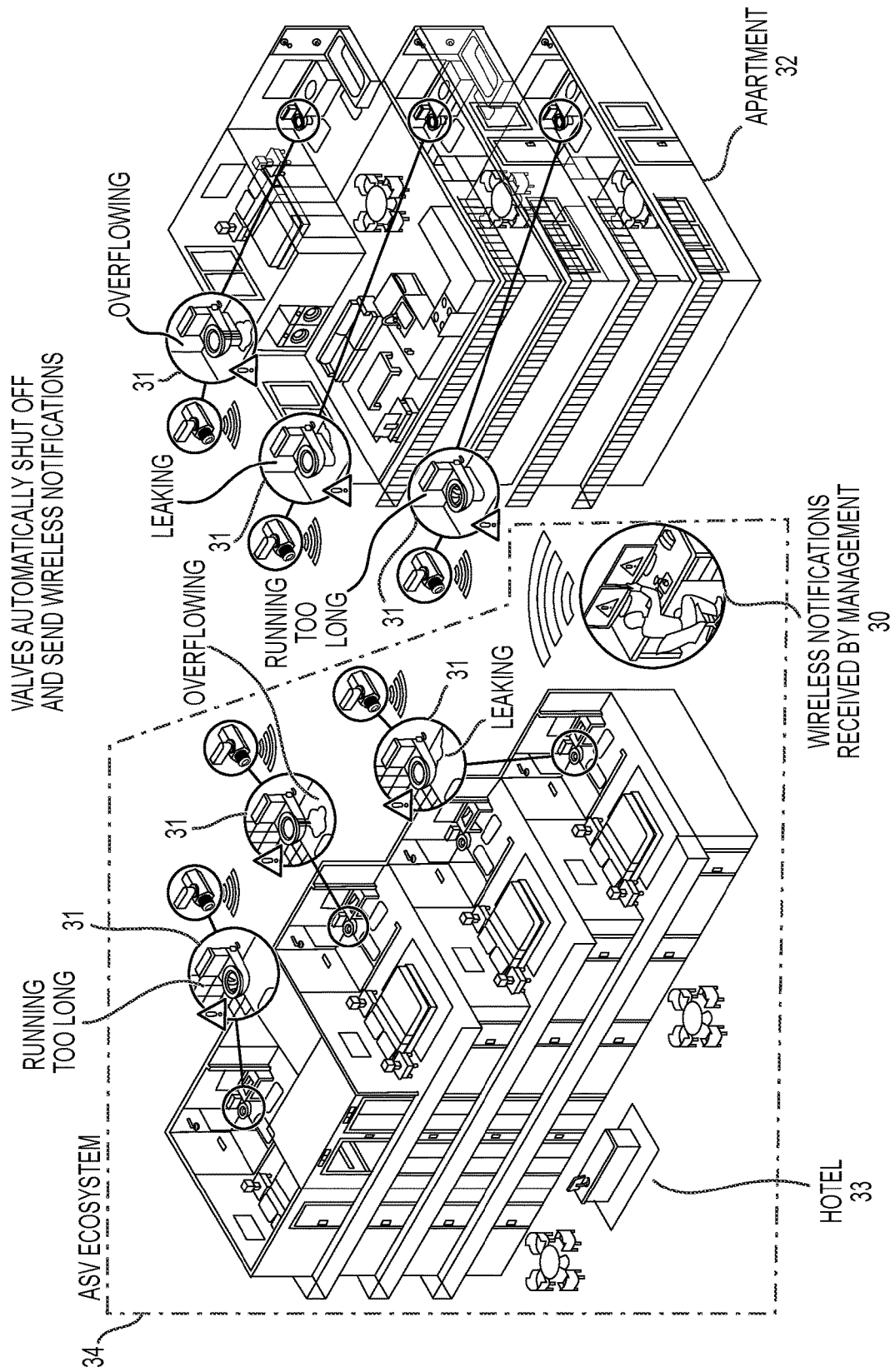
FIG. 5 is an illustration of 2 applications of multiple ASV's and enterprise software forming an overall system ecosystem.

FIG. 4 shows the ASV, 1, in the configuration of wireless communications, 13, and using a manual reset, 12, for the valve. The data communicated via the wireless communications, 13, is sent to an enterprise software system, 30, for data capture, analysis, and user interface. Since the ASV 1 can be made low cost, is self-powered, and small size it can be located at many appliance locations, allowing for an ecosystem, 34, of ASV's 1 to be created, as seen in FIG. 5. FIG. 5 illustrates the ASV 1 used as a sensor for toilets, 31, distributed throughout, but not limited to, a multi-occupancy dwelling such as an apartment house, 32, or a hotel, 33. The sensor, 31, may be used, but not limited to, for monitoring excess water flow or leakage. Once a pre-arranged threshold is exceeded the device, 31, automatically and autonomously shuts off the water flow to the offending appliance. The device, 31, then signals the enterprise software system (ESS), 30, as to the shut off condition. The ESS can then dispatch a technician to investigate the offending appliance, can notify management as to an issue, can request a new part for the toilet, etc. depending on how the ESS is configured and what information and action is deemed important by the end user. By the same token, since the device, 31, is self-powered, wireless, and regularly maintained in an optimal power condition due to the MCU, 9, and possible AI/ML, 14, on-board analysis, the device can periodically gather information on flow rates, mass volume usage, number of times that the toilet is flushed, etc. due to its multi-sensor type capability and implementation, so that the ESS, 30, can a mass critical information that allows for long term ecosystem monitoring health reporting, and maintenance needs prognostication. It is to be noted that prior art requires the analysis and prognostication, the "smarts", if present to be done by the ESS, whereas this invention as taught herein, can have the "smarts" either in the ASV 1 itself or the ESS allowing for efficient ecosystem, 34, design, architecture, and implementation. Additionally, as the device, 31, has the capability of full duplex wireless communications capability, 13, as devised for this example in FIG. 5, communications from the ESS, 30, directly to an individual device, 31, is also highly desirable. For example, as the ESS 30 monitors the overall ecosystem, 34, the ESS 30 might recognize that a particular device, 31, needs only 35 more flushes before the pressure in the line feeding the particular toilet exceeds some value and that the ASV 1 for that device needs to report when the threshold of 35 flushes is exceeded so that a technician can serve the pipe feeding the toilet, as it might be in a condition to either leak or burst. Since both the device, 31, and the ESS, 30, form a living, adaptable ecosystem, 34—predictive maintenance, prognostication, predictive behavior are all possible, allowing for the overall ecosystem, 34, to bring realizable and quantifiable return on investment for the end user for water management.

Furthermore, it is desired in an ecosystem 34, such as a hotel or for that matter multiple hotels, that might have hundreds if not thousands of ASV's 1 distributed throughout, that the precise location of each individual ASV 1 is known. The invention, as taught herein, contemplates this and the individual ASV's location, with its unique identification code embedded in the MCU's code, can be precisely determined by a combination of internal GPS capability, 55, to get within 30 m of the exact ASV location, and RSSI triangulation from neighboring ASV's 1 to get precise position within the 30 m. This ASV location reporting capability would be beneficial for the end user to for example, and not limited to, determine if an ASV 1 has been moved from one hotel room to another, has been stolen, or for general asset management purposes as one skilled in the art appreciates. It is to be appreciated by those skilled in the arts that the combination of GPS and RSSI triangulation are just one of many topologies that can be used for ASV geo-location determination. For example, and not limited to, in GPS denied environments such as if the ASV 1 is used underground in mining operations, inertial measurements units, IMU's, may be substituted or used in combination with GPS, 55. Hence, FIG. 1 can easily be updated to include IMU's in addition to the GPS, 55. It is the capability of determining ASV location that is the important invention contemplated herein and not the particular method of how that location determination is made.

Figure 6:
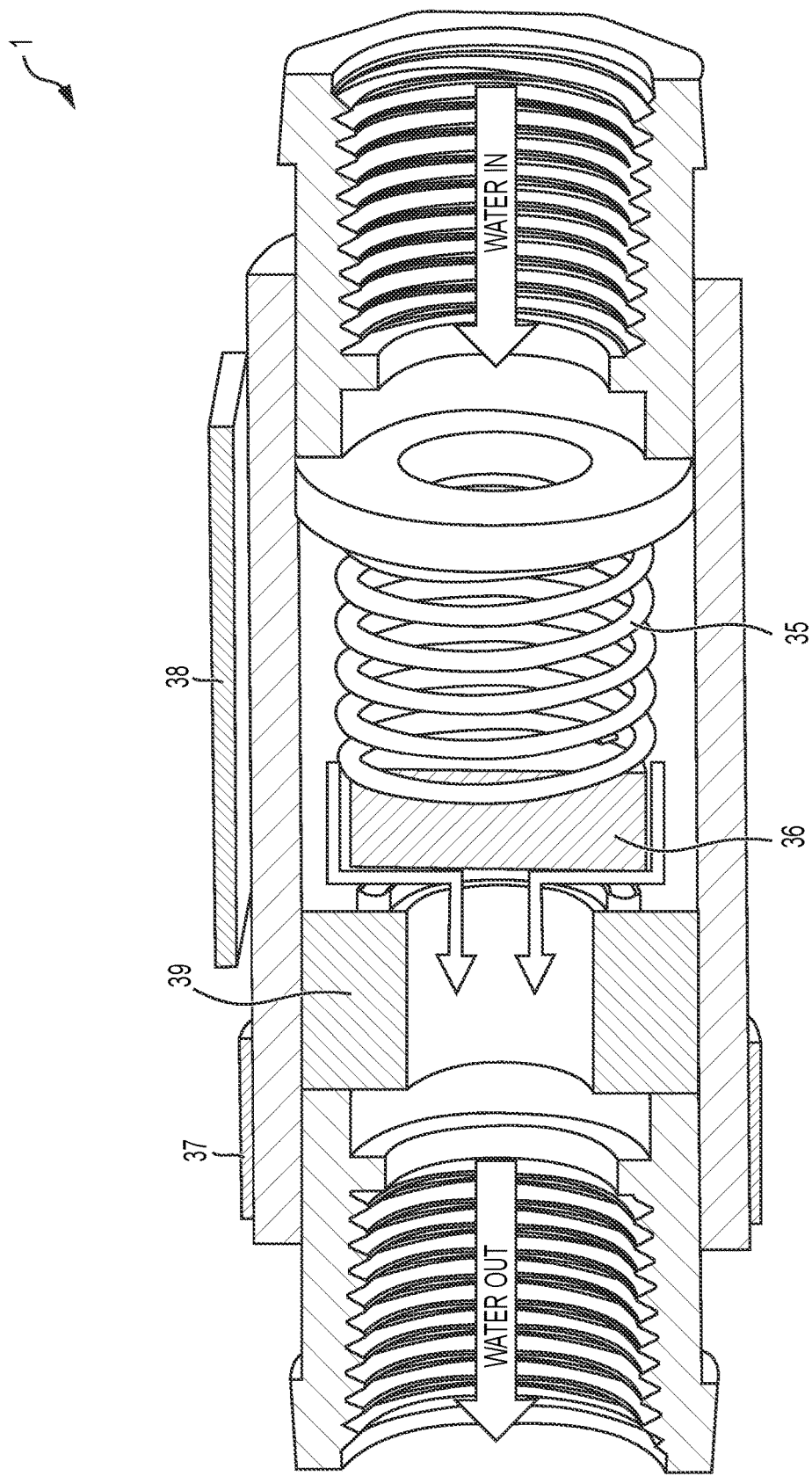
FIG. 6 is a cutaway view of a preferred embodiment of the invention as taught herein, in an in-line ASV configuration.
Figure 7:
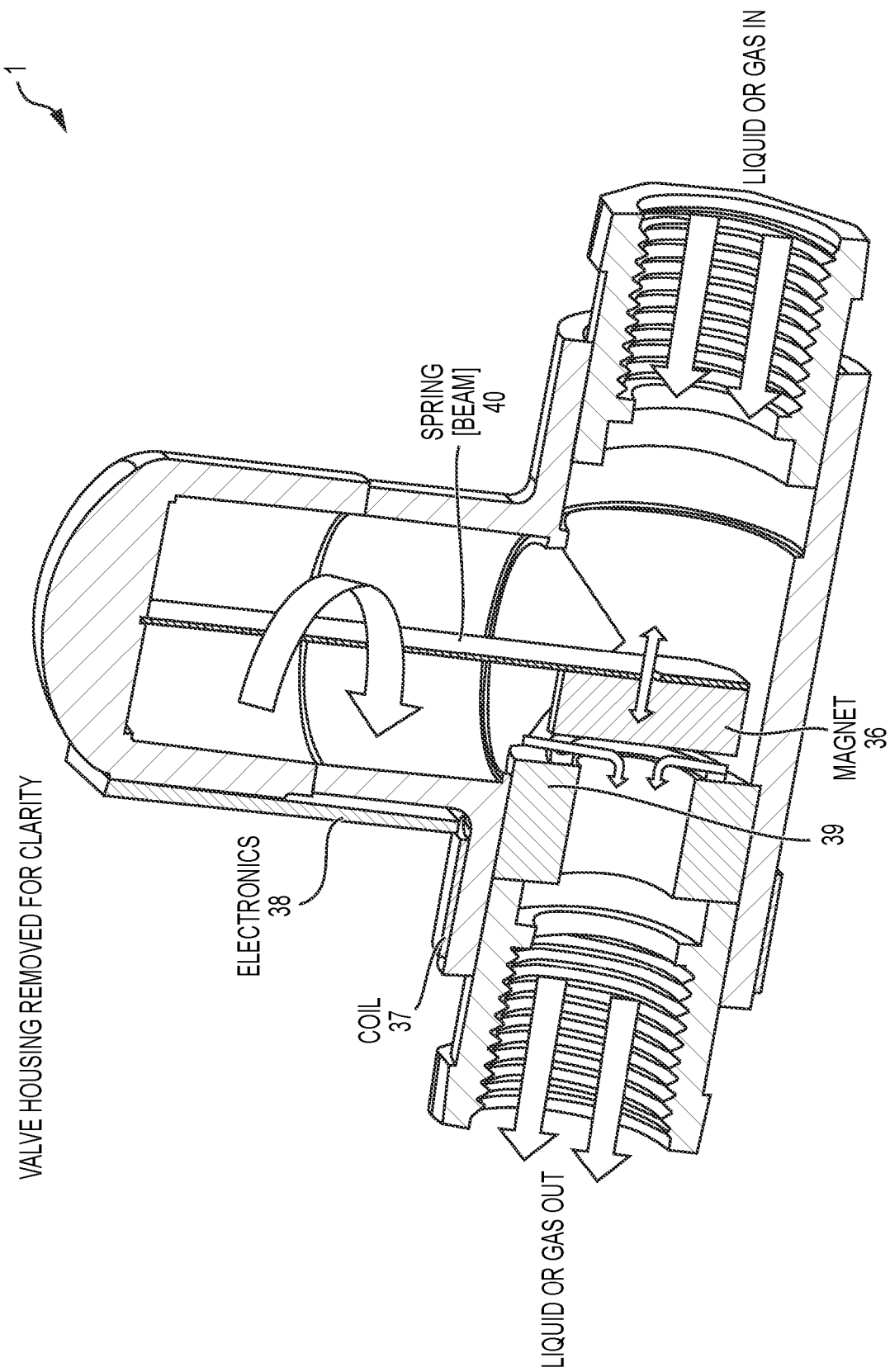
FIG. 7 is a cutaway view of another preferred embodiment of the invention as taught herein, in a semi-in-line ASV configuration.

Another preferred embodiment combines the physical domain transduction element, 5, the energy harvesting mechanism, 7, the flow sensor, 6, and the shutoff valve, 11, into a compact single mechanical structure, as shown in FIG. 6. FIG. 6 is a cutaway view of the preferred embodiment. This configuration shows an in-line valve using water as the flowing material. As water enters the ASV 1, it flows thru a spring structure, 35. Magnet 36 represents a solid barrier to the water flow so that the water flows around the magnet. However, since the magnet 36 is mounted to the spring 35, and the water is a flowing mass, the spring 35 will stretch with the force imparted by the water. This will be a turbulent flow so that the magnet will oscillate back and forth within the flow. This oscillation represents a change in flux for coil 37. As such, coil 37, will generate a voltage signal due to Faraday's law of induction, as taught herein. Hence, the generated voltage signal will be proportional to the water flow and a flow sensor is realized. Furthermore, this voltage signal can be applied to the electronics components, 38, as taught herein. Additionally, if the polarity of the coil 37 is reversed by the electronics, 38, through for example a switch, and a pulse of current is sent to the coil 37, turning it into an electromagnet, the magnet 36 will now be pulled towards the coil 37. As the magnet 36 is pulled towards coil 37, it engages with O-ring, 39 and stops the water flow. The back pressure of the flowing water will hold the magnet in place, thereby creating a shutoff valve, 11, as taught herein. By reversing the polarity to coil 37, again, and sending a current thru 37, the magnet, 36, can be made to disengage with O-ring 39, and the valve reopens to water flow, as taught herein for valve reset, 12. It will be appreciated by those skilled in the arts that many different spring/magnet/O-ring/coil configurations can be anticipated to result in this ASV 1 configuration. One such example has already been contemplated in FIG. 3c. For another example, the ASV 1 may be configured to use a cantilever beam as the spring element, 40, as shown in FIG. 7. Spring element, 40, in this embodiment is a simple end-loaded cantilever beam of length, width, and thickness-all of which are design parameters to determine the bending of the beam at the magnet, 36 end of the beam. Depending on the material flow and the density of the material that is flowing, the material will generate a force that impinges on the entire beam but in particular at the magnet end of the beam, thereby generating oscillatory movement and hence, operation as taught herein. The precise design of such a beam for given material flow conditions is well understood by those skilled in the art.

Figure 8B:
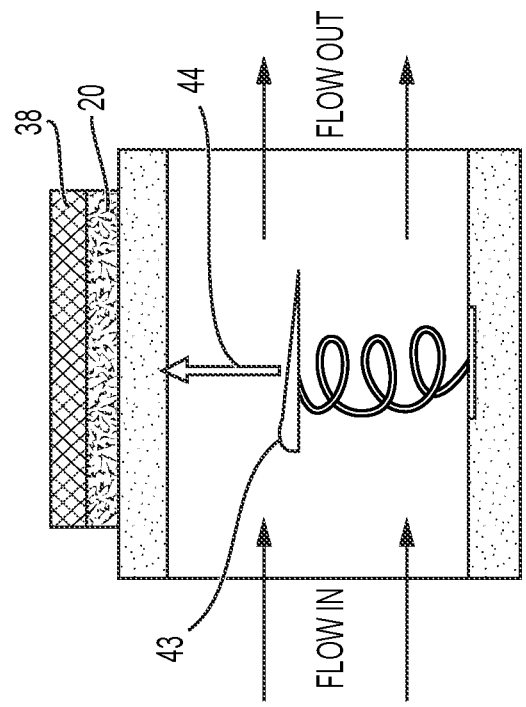
FIGS. 8A and 8B is a cross sectional view of 2 types of flow sensors, as invented and taught herein, that are minimum movement devices.
Figure 8A:
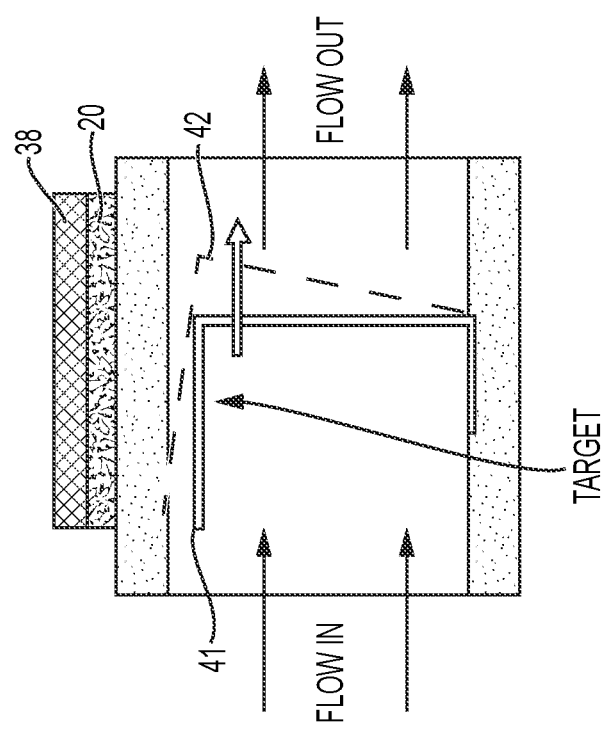

There are also times when the movement of the mechanical to electrical transduction element, 5, is not desired, as moving parts can represent a part that can degrade over time due to wear and tear, as already seen in FIG. 3c. In this preferred embodiment, using the devices in FIGS. 8a and 8b, we can sacrifice the energy harvesting aspect of the ASV 1 for a straightforward sensing capability of flowing material with a sensor that exhibits very limited motion. This is shown in FIGS. 8a and 8b. In FIG. 8A, target, 41, made out of a compliant material such as brass, will deflect in direction, 42, as the material flows past it since the material has a certain mass and velocity creating a momentum that is imparted to the target 41. Since target 41 is anchored at some point within the flow path, this imparted momentum will bend the beam in the direction, 42 as the material flows. Coil 20 and electronics 38 will detect this deflection as the coil's inductance will change based on where the target 41 is located relative to the face of the coil, 20, as taught, for example, in Kain in U.S. Pat. No. 7,296,485, incorporated by reference in its entirety. Similarly, target 43, in this case a target designed as an airfoil attached to a spring, will provide lift in the material flow and will rise in the direction 44, with detection of the rise of the airfoil towards coil, 20 being proportional to the material flow. The faster the flow, the more lift generated as is well known by those skilled in the art.

While specific embodiments of the invention have been described above, it will be appreciated that the invention may be practiced other than as described. The embodiment (s) described, and references in the specification to "one embodiment," "an embodiment," "an example embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The invention claimed is:

1. An automatic shut-off valve (ASV) comprising:
 a housing comprising:

a processor;
an energy storage device for supplying power to the processor; and
a barrier separating the housing from an external material; and
a flow chamber directly coupled to the housing comprising:
an inlet;
an outlet; and
a flow chamber forming a sensor for measuring at least one property of the external material passing through the flow chamber,
wherein the barrier forms at least a portion of a wall of the flow chamber, and
wherein the barrier is in direct contact with the external material;
a pressure diaphragm embedded within the barrier,
wherein the pressure diaphragm moves in response to the external material passing through the flow chamber; and
an integrated shut-off valve at the inlet or the outlet forming part of the flow chamber for enabling or disabling a flow of the external material through the flow chamber in response to a signal from the processor.

2. The ASV according to claim 1, wherein the housing further comprises:
a wireless communication module for communicating data from the processor to at least one external device via wireless communication.

3. The ASV according to claim 2, wherein the wireless communication module is in direct wireless communication with a second ASV or other external device without any intermediary connection, and
wherein the direct wireless communication is full-duplex.

4. The ASV according to claim 3, further comprising:
a GPS module for reporting a GPS location of the ASV to the second ASV.

5. The ASV according to claim 4, further comprising:
an inertial measurement unit (IMU) for determining an inertial measurement including force, an angular rate, or an orientation of the ASV.

6. The ASV according to claim 4, wherein the IMU utilizes the GPS location of the ASV or inertial measurement of the ASV to determine a location of the ASV.

7. The ASV according to claim 4, wherein the second ASV is wireless coupled to a plurality of ASVs, and
wherein the second ASV determines a location of the ASV using location data received from the plurality of ASVs.

8. The ASV according to claim 1,
wherein the barrier is gas impermeable and liquid impermeable.

9. The ASV according to claim 8,
wherein the barrier does not block electric fields, magnetic fields or electromagnetic fields.

10. The ASV according to claim 1,
wherein the external material is a flowing liquid, flowing gas, or flowing solid.

11. The ASV according to claim 1,
wherein the pressure diaphragm comprises a magnet, and:
wherein the housing further comprises:
an energy harvester for converting a magnetic signal from the magnet into a voltage or current used to charge the energy storage device under control of the processor.

12. The ASV according to claim 11, wherein the movement of the pressure diaphragm is constant when the flow of the external material is enabled by the integrated shut-off valve.

13. The ASV according to claim 1,
wherein the housing further comprises:
a flow sensing component for converting a signal from the pressure diaphragm to a flow measurement of the external material.

14. The ASV according to claim 13,
wherein the flow measurement is a real-time flow rate of the external material.

15. The ASV according to claim 1,
wherein the energy storage device is a battery, a supercapacitor, or a fuel cell.

16. The ASV according to claim 1,
wherein the flow chamber further comprises:
a second sensor selected from the group consisting of a temperature sensor, a pressure sensor, a conductivity sensor, a force sensor, an optical sensor, an ultrasonic sensor, a radio frequency sensor, or a displacement sensor.

17. The ASV according to claim 1,
wherein the ASV is autonomous and comprises no user interface.

18. The ASV according to claim 1, further comprising:
a valve reset for resetting a state of the ASV to a default configuration.

19. The ASV according to claim 18,
wherein the valve reset is a mechanical reset.

20. The ASV according to claim 18,
wherein the valve reset is controlled by an electronic signal either received from an external device or internally from the processor.

21. The ASV according to claim 1,
wherein the inlet and outlet are in a flow path of the external material to an appliance or through an appliance.

* * * * *